United States Patent [19]
Folkins et al.

[11] Patent Number: 5,839,016
[45] Date of Patent: Nov. 17, 1998

[54] FUSED IMAGE SENSING

[75] Inventors: Jeffrey J. Folkins, Rochester; Vittorio R. Castelli, Yorktown Heights, both of N.Y.

[73] Assignee: Xerox Corporation, Stamford, Conn.

[21] Appl. No.: 977,280

[22] Filed: Nov. 24, 1997

[51] Int. Cl.⁶ .................................................. G03G 15/00
[52] U.S. Cl. ............................................ 399/46; 399/401
[58] Field of Search ................................. 399/45, 49, 60, 399/53, 51, 66, 67, 401, 46; 356/445

[56] References Cited

U.S. PATENT DOCUMENTS

| | | | |
|---|---|---|---|
| 4,239,372 | 12/1980 | Iwai | 399/22 |
| 4,318,610 | 3/1982 | Grace | 399/49 |
| 4,348,099 | 9/1982 | Fantozzi | 399/48 |
| 4,505,572 | 3/1985 | Ashida et al. | 399/22 |
| 4,618,242 | 10/1986 | Yamagishi | 399/45 |
| 4,660,059 | 4/1987 | O'Brien | 347/115 |
| 4,989,985 | 2/1991 | Hubble et al. | 356/445 |
| 5,101,232 | 3/1992 | Evans et al. | 399/160 |
| 5,139,339 | 8/1992 | Courtney et al. | 399/220 X |
| 5,173,733 | 12/1992 | Green | 399/26 |
| 5,266,997 | 11/1993 | Nakane et al. | 399/49 |
| 5,291,245 | 3/1994 | Charnitski et al. | 399/51 |
| 5,315,351 | 5/1994 | Matsushiro et al. | 399/49 |
| 5,329,338 | 7/1994 | Merz et al. | 399/21 |
| 5,343,282 | 8/1994 | Kazaki et al. | 399/39 |
| 5,402,222 | 3/1995 | Haneda et al. | 399/223 |
| 5,410,388 | 4/1995 | Pacer et al. | 399/49 |
| 5,457,518 | 10/1995 | Ashikaga et al. | 399/28 |
| 5,519,497 | 5/1996 | Hubble, III et al. | 356/445 |
| 5,574,527 | 11/1996 | Folkins et al. | 399/9 |
| 5,765,074 | 6/1998 | Yasui et al. | 399/66 |

FOREIGN PATENT DOCUMENTS

| | | |
|---|---|---|
| 60-86574 | 5/1985 | Japan . |
| 4-67172 | 3/1992 | Japan . |

*Primary Examiner*—S. Lee
*Attorney, Agent, or Firm*—John M. Kelly

[57] ABSTRACT

This invention provides for duplex use of densitometers. An image is produced on a substrate, that substrate is brought back through the transfer station in a duplex fashion (that is, the substrate is inverted), and a sensor senses the image on the substrate. Beneficially, the sensor senses one or more parameters such as color registration, color occlusion/ interference, black separation in color REaD printing, colorimetry, and the overall transfer and fusing process; and a printing process is controlled based on the sensed parameters.

20 Claims, 2 Drawing Sheets

FUSED IMAGE SENSING

FIELD OF THE INVENTION

This invention relates to electrophotographic printing. More particularly it concerns use of an optical sensor located in the paper path and adjacent a photoreceptor.

BACKGROUND OF THE INVENTION

Electrophotographic marking is a well known and commonly used method of copying or printing documents. Electrophotographic marking is performed by exposing a light image representation of a desired document onto a substantially uniformly charged photoreceptor. In response to that light image the photoreceptor discharges so as to create an electrostatic latent image of the desired document on the photoreceptor's surface. Toner particles are then deposited onto that latent image so as to form a toner image. That toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

The foregoing broadly describes a prototypical black and white electrophotographic printing machine. Electrophotographic marking can also produce color images by repeating the above process once for each color of toner that is used to make the composite color image. For example, in one color process, referred to herein as the REaD IOI process (Recharge, Expose, and Develop, Image On Image), a charged photoreceptive surface is exposed to a light image which represents a first color, say black. The resulting electrostatic latent image is then developed with black toner particles to produce a black toner image. The charge, expose, and develop process is repeated for a second color, say yellow, then for a third color, say magenta, and finally for a fourth color, say cyan. The various color toner particles are placed in superimposed registration so that a desired composite color image results. That composite color image is then transferred and fused onto a substrate.

Since electrophotographic printing is subject to many variables, sensors are often used to measure various process parameters. For example, optical sensors have been used to measure the toner density of developed images; to detect registration marks; to detect a photoreceptor belt seams; to detect substrates; to verify paper transit timing and/or to determine if a jam or other fault has occurred; and to detect whether a substrate is opaque or transparent. To reduce the size and cost of printing machines it is beneficial to have a single optical sensor perform multiple functions.

U.S. Pat. No. 5,574,527 entitled, "MULTIPLE USE OF A SENSOR IN A PRINTING MACHINE," which issued on 12 Nov. 1996 to Folkins, describes a method and apparatus for sensing multiple process parameters using a single optical sensor. FIG. 1 of that patent, reproduced as FIG. 1 herein, shows a printing machine 8 in which a sensor 50 is located in the path of a substrate 38 and adjacent the photoreceptor. That location is beneficial in that many parameters of interest can be used at that location, particularly in a multiple pass REaD IOI printing machine. However, the printing machine 8 may not make optimal use of the densitometer. Therefore, a printing machine and printing method that better utilizes optical sensors, and/or that uses such optical sensors for other purposes, would be beneficial.

The following disclosures may be relevant to various aspects of the present invention:

U.S. Pat. No. 4,989,985

Patentee: Hubble, III et al.

Issued: Feb. 5, 1991

U.S. Pat. No. 4,239,372

Patentee: Iwai

Issued: Dec, 16, 1980

U.S. Pat. No. 4,505,572

Patentee: Ashida et al.

Issued: Mar. 19, 1995

U.S. Pat. No. 5,139,339

Patentee: Courtney et al.

Issued: Aug. 18, 1992

U.S. Pat. No. 5,329,338

Patentee: Merz et al.

Issued: Jul. 12, 1994

U.S. Pat. No. 5,101,232

Patentee: Evans et al.

Issued: Mar. 31, 1992

U.S. Pat. No. 5,291,245

Patentee: Chamitski et al.

Issued: Mar. 1, 1994

U.S. Pat. No. 4,348,099

Patentee: Fantozzi

Issued: Sep. 7, 1982

U.S. Pat. No. 5,519,497

Patentee: Hubble III et al.

Issued: May 21, 1996

The relevant portions of the foregoing disclosures may be briefly summarized as follows:

U.S. Pat. No. 4,989,985 discloses a color electrophotographic printing machine with an infrared densitometer (IRD) used to detect a reduction in the specular reflectivity as toner particles are progressively deposited on a photoconductive member. The densitometer measures the developability of the latent image which is used to regulate the amount of toner used in the development process.

U.S. Pat. No. 4,239,372 teaches a copying machine which detects toner density and a non-stripped unseparated transfer sheet with a single combination of a light projecting element and a light receiving element. The amount of toner supplied is controlled in accordance with the voltage developed by the reflection of light from an indexing image developed on the photosensitive member, the same reflected light also detecting the presence of an unseparated transfer sheet.

U.S. Pat. No. 4,505,572 discloses a sensor unit in an electrostatic reproducing apparatus which is capable of sensing the concentration of toner and the jamming of non-stripped unseparated sheets of recording paper after image transfer. The sensor unit is a light emitting element and a light receiving element disposed close to the surface of a photosensitive member at a position downstream of the position where the printed sheet of recording paper separates from the photosensitive member. One of the light emitting elements is a visible-light emitting diode used for detecting jamming of the sheet of recording paper and the other light emitting element is an infrared-light emitting diode used for detecting the toner concentration.

U.S. Pat. No. 5,139,339 discloses a media discriminating and presence sensor that can detect and discriminate between paper and transparencies using a light emitting diode and two detectors configured to measure both diffuse and specular reflectivity of the media. Opaque papers reflect light diffusely and transparencies reflect light specularly. These measurements are used to discriminate between the two types of copysheets.

U.S. Pat. No. 5,329,338 teaches detecting and discriminating a copysheet in an electronic reprographic printing system. A diffuse reflective sensor is located adjacent to the path over which the copy sheet moves. The sensor is disposed so that its optical axis intersects the copy sheet where the angle of intersection between the copysheet and the optical axis remains within a specified range of angles for the maximum length of the copy sheet. Another jam detection sensor is disposed along inlet baffles of a paper path and is used to detect both opaque and transparent copysheets. A distinguishing sensor is also disposed adjacent copysheet inlet baffles with its optical axis aligned so that a transparent copysheet is not detected while an opaque copy sheet is detected.

U.S. Pat. No. 4,657,369 teaches an electrostatic copying machine comprising an internal computer system which regulates the movement of an endless photoconductive belt based on signals received by a photosensing device which coordinates the position of a photoconductive belt based on the passage and detection of a single notch punched into the belt. The notch is placed at a predetermined distance from the belt seam and is detected by a photosensor. This information allows the machine belt drive system to avoid placing an image onto the belt seam during the copying process.

U.S. Pat. No. 5,101,232 discloses controlling the velocity of the photoreceptor within a multiple image reprographic machine having a seamed, web-type photoreceptor. To avoid having a seam of the belt within a latent image, the position or velocity of the belt is controlled by having an optoelectronic sensor detect a timing or belt hole. The belt sensor is coordinated with a registration sensor to adjust the speed of the belt.

U.S. Pat. No. 5,291,245 discloses a sensor positioned on one side of a photoreceptor belt in opposed relationship to a light source which is used to detect the seam in the photoreceptor belt. When the seam passes between the light source and the sensor a characteristic output signal is created and recognized by the system software which controls imager operation to ensure that latent images are not formed across the seam. The same belt seam sensor may also be used to detect developed toner marks on the photoreceptor, which are used to register successive images.

U.S. Pat. No. 4,348,099 teaches a sample data control system with a charge control loop, an illumination control loop, a toner dispensing control loop, and a bias control loop. Two test targets, each having two test patches are selectively exposed in various combinations to provide test data in the photoreceptor image area for suitable sensing and control of the charge, illumination, toner dispensing, and bias control loops.

U.S. Pat. No. 5,519,497 discloses an enhanced toner area coverage (ETAC) sensor. In the operation of this densitometer, collimated light rays are projected onto a test patch including marking particles which are progressively deposited on a moving photoconductive belt. The light rays reflected from the test patch are collected and directed onto a photodiode array. The photodiode array generates electrical signals proportional to the total flux and a diffuse component of the total flux of the reflected light rays. Circuitry compares the electrical signals and determines the difference to generate an electrical signal proportional to the specular component of the total flux of the reflected light rays. Additional circuitry adds the electrical signals proportional to the total flux and the diffuse component of the total flux of the reflected light rays and compares the result of the summed signal to the specular component to provide a total diffuse signal for controlling developed mass.

The following pending patent application, which is assigned to the same assignee as this patent application, may also disclose potentially relevant information: U.S. patent application Ser. No. 08/451,609 filed on May 26, 1995, entitled "Wide Area Beam Sensing Method and Apparatus for Image Registration Calibration in a Color Printer" discloses using a wide area beam sensor to detect image registration calibration in a full color printing machine without requiring precise timing measurements. This is accomplished by moving a photoreceptor through a printing cycle so that sets of multiple black toner registration marks are formed on different areas of the photoreceptor and second sets of multiple non-black toner registration marks are formed on the photoreceptor corresponding respectively to the black marks in each set ol the first sets of black marks so that a series of sets of multicolor registrations marks are created. A light source for producing a wide area beam illuminates each set of the series of sets of multicolor marks and the wide area beam sensor measures the scattered or diffuse light reflected from each set of the illuminated sets of multicolor marks, producing an actual light reflectance measurement value from each illuminated set. The printer has a comparing device for determining the degree of actual image misregistration by comparing each of the actual light reflectance measurement values with the stored predetermined registration offset value corresponding to a predetermined condition of image misregistration for each illuminated set of multicolor marks.

SUMMARY OF THE INVENTION

This invention provides for using an optical sensor in a duplex fashion. According to the principles of the present invention an image is produced on a substrate, that substrate is brought back through the transfer station in a duplex fashion (that is, the substrate is inverted), and an optical sensor then senses the toner on the substrate. Beneficially, the output of the optical sensor can be used to measure one or more optical parameters such as color registration, occlusion/interference with black separation in color REaD printing, colorimetry and color densities, and the quality of the transfer and fusing process.

BRIEF DESCRIPTION OF THE DRAWINGS

Other aspects of the present invention will become apparent as the following description proceeds and upon reference to the following figures.

DETAILED DESCRIPTION OF A PREFERRED EMBODIMENT

Figure 1:
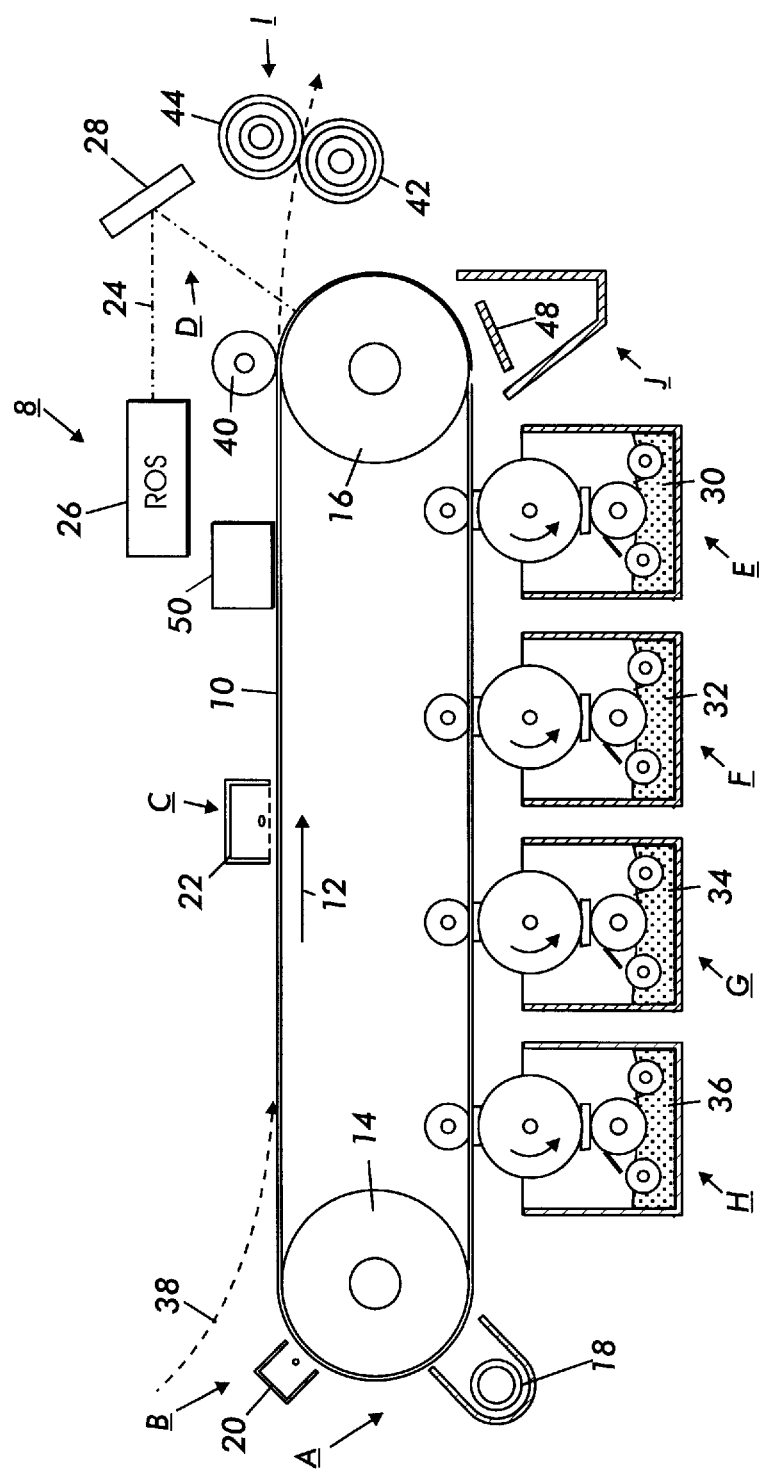
FIG. 1 schematically illustrates a prior art 5-cycle color electrophotographic printing machine.
Figure 2:
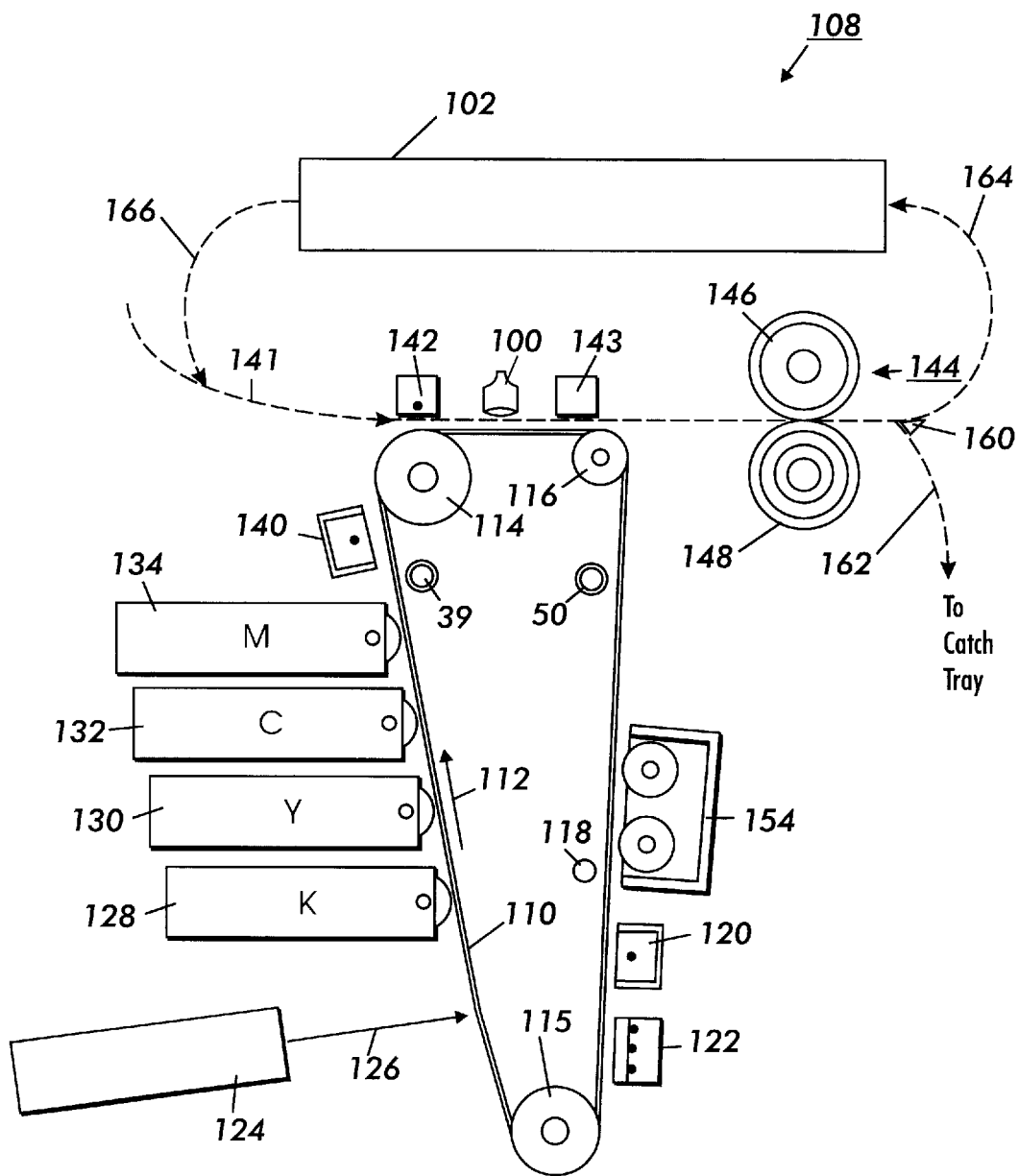
FIG. 2 schematically illustrates a 4-cycle color electrophotographic printing machine that incorporates the principles of the present invention While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

A preferred embodiment of the present invention, illustrated in FIG. 2, is a printing machine 108 in which a composite toner image is transferred onto a substrate, and then that substrate is inverted in a duplex fashion and returned past an optical sensor in the transfer path. By duplex it is meant that the side of the substrate having the toner layer, which was adjacent a photoreceptor, is inverted such that the toner side is away from the photoreceptor. This enables various parameters of the transferred image, and thus the operation of the transfer station and/or fusing station, to be sensed.

The printing machine 108 includes an Active Matrix (AMAT) photoreceptor belt 110 which travels in the direction indicated by the arrow 112. Belt travel is brought about by mounting the photoreceptor belt about a drive roller 114 (which is driven by a motor, which is not shown) and tension rollers 115 and 116.

As the photoreceptor belt travels each part of it passes through each of the subsequently described process stations. For convenience, a single section of the photoreceptor belt, referred to as the image area, is identified. The image area is that part of the photoreceptor belt which is to receive the various toner layers which, after being transferred and fused to a substrate, produce the final color image. While the photoreceptor belt may have numerous image areas, since each image area is processed in the same way a description of the processing of one image area suffices to fully explain the operation of the printing machine.

As previously mentioned the production of a document takes place in 4 cycles. The first cycle begins with the image area passing a "precharge" erase lamp 118 that illuminates the image area so as to cause any residual charge which might exist on the image area to be discharged. Such erase lamps are common in high quality systems.

As the photoreceptor belt continues its travel the image area passes a charging station comprised of a DC scorotron 120 and an AC scorotron 122. To charge the image area in preparation for exposure to create a latent image for black toner the DC scorotron charges the image area to a substantially uniform potential of, for example, about −500 volts. During this initial charging the AC scorotron 122 need not be used. However, using both the DC scorotron 120 and the AC scorotron 122 will usually give better charge uniformity. It should be understood that the actual charge placed on the photoreceptor for the black toner will depend upon many variables, such as black toner mass and the settings of the black development station (see below).

After passing through the charging station the image area advances until it reaches an exposure station 124. At the exposure station the charged image area is exposed to a modulated laser beam 126 that raster scans the image area such that an electrostatic latent representation of a black image is produced. For example, illuminated sections of the image area might be discharged by the beam 126 to about −50 volts. Thus after exposure the image area has a voltage profile comprised of relatively high voltage areas of about −500 volts and of relatively low voltage areas of about −50 volts.

After passing the exposure station 124 the exposed image area passes a black development station 128 which deposits negatively charged black toner particles onto the image area. The charged black toner adheres to the illuminated areas of the image area thereby causing the voltage of the illuminated parts of the image area to be about −200 volts. The non-illuminated parts of the image area remain at −500 volts.

While the black development station 128 could be a magnetic brush developer, a scavengeless developer may be somewhat better. One benefit of scavengeless development is that it does not disturb previously deposited toner layers. Since during the first cycle the image area does not have a previously developed toner layer, the use of scavengeless development is not absolutely required as long as the developer is physically cammed away during other cycles. However, since the other development stations (described below) use scavengeless development it may be better to use scavengeless development at each development station.

After passing the black development station the image area advances past a number of other stations whose purposes are described subsequently. Notably the image area passes an optical sensor 100, which together with a duplexer inverter 102, are integral to the present invention and whose purpose, operation, and interaction are described below. As the image area continues to advance it eventually returns to the precharge erase lamp 118 and the second cycle begins.

To help prevent black toner from being pulled off of the photoreceptor and into the yellow developer, thereby causing "Black in Yellow" contamination, the pretransfer erase lamp 118 exposes the image area as the image area advances by the pretransfer erase lamp. Then the DC scorotron 120 recharges the image area to the charge level desired for exposure and development of the yellow image. Here, the AC scorotron 22 is not used. This expose-DC recharge scheme between black and yellow is described in more detail in U.S. patent application Ser. No. (Attorney Docket number D/96750). The expose-DC recharge scheme is only one of many ways to recharge a developed image area, and in no way is its use in the printing machine 108 meant to limit the present invention.

The recharged image area with its black toner layer then advances to the exposure station 124. That exposure station exposes the image area with the beam 126 so as to produce an electrostatic latent representation of a yellow image. As an example of the charges on the image area, the non-illuminated parts of the image area might have a potential about −450 while the illuminated areas are discharged to about −50 volts.

After passing the exposure station 124 the now exposed image area advances past a yellow development station 130 that deposits yellow toner onto the image area. Since the image area already has a black toner layer the yellow development station should use a scavengeless developer.

After passing the yellow development station the image area and its two toner layers advance past the precharge exposure lamp, which is not illuminated, to the charging station. The third cycle begins.

During the third and fourth cycles the charging station uses split recharging. In split recharging the DC scorotron 120 overcharges the image area and its toner layers to a more negative potential than that which the image area and its toner layers are to have when they are next exposed. For example, the image area may be charged to a potential of about −700 volts. The AC scorotron 122 then reduces the negative charge on the image area by applying positive ions so as to recharge the image area to the desired potential for the next exposure. Since the AC scorotron supplies positive ions to the toner layers some of the toner particles take positive charges or have their negative charges neutralized.

After passing the AC scorotron the substantially uniformly charged image area with its two toner layers advances once again to the exposure station 124. The exposure station again exposes the image area to the beam 26, this time with a light representation that discharges some parts of the image area to create a electrostatic latent representation of a cyan image. The image area then advances through a magenta development station 132. The magenta development station, preferably a scavengeless developer, advances magenta toner onto the image area. The result is a third toner layer on the image area.

The image area with its three toner layers then advances past the precharge erase lamp to the charging station. During this pass the precharge erase lamp in not on. The fourth cycle then begins.

The DC scorotron 120 and the AC scorotron 122 again split recharge the image area (which now has three toner layers) to produce the desired charge on the photoreceptor 110. The substantially uniformly charged image area with its three toner layers then advances once again to the exposure station 124. The exposure station exposes the image area again, this time with a light representation that discharges some parts of the image area to create an electrostatic latent representation of a cyan image. After passing the exposure station the image area passes a cyan development station 134. The cyan development station, also a scavengeless developer, advances cyan toner onto the image area.

After passing the cyan development station the image area has four toner layers which together make up a composite color toner image. That composite color toner image is comprised of individual toner particles which have charge potentials which vary widely. Indeed, some of those particles take a positive charge. Transferring such a composite toner image onto a substrate would result in a degraded final image. Therefore it is beneficial to prepare the composite color toner image for transfer.

To prepare for transfer a pretransfer erase lamp 39 discharges the image area to produce a relatively low charge level on the photoreceptor. The image area then passes a pretransfer scorotron 140 that performs a pre-transfer charging function by supplying sufficient negative ions to the image area such that substantially all of the previously positively charged toner particles are reversed in polarity.

The image area continues to advance in the direction 112 past the driven roller 114. A substrate 141 is then placed over the image area using a sheet feeder (which is not shown). As the image area and substrate continue their travel they pass a transfer corotron 142. That corotron applies positive ions onto back of the substrate 141. Those ions attract the negatively charged toner particles onto the substrate.

As the substrate continues its travel is passes a detack corotron 143. That corotron neutralizes some of the charge on the substrate to assist separation of the substrate from the photoreceptor 110. As the lip of the substrate moves around the tension roller 116 the lip separates from the photoreceptor. The substrate is then directed into a fuser 144. A heated fuser roller 148 and a pressure roller 146 create a nip through which the substrate 141 passes. The combination of pressure and heat at the nip causes the composite color toner image to fuse into the substrate.

After fusing, the substrate is directed toward a direction controller 160. If the image on the substrate for an end user the direction controller gate 160 directs the substrate along a path 162 into a catch tray. However, if the substrate contains a test image, that is, a special image that is to be used to test system process parameters, the direction controller 160 directs the substrate along a path 164 into a substrate inverter 102. The substrate inverter inverts the substrate, that is, it turns the side of the paper that faced down to face up. Since the side of the substrate having a fused image was down, the image side now faces up. Inverters are well known in the art and are common features of duplex printers and copiers (printers and copiers that mark both sides of the paper). The inverted substrate is then passed via path 166 back onto the photoreceptor such that the fused toner layer faces the sensor 100. As the substrate advances in the direction 112 it passes the sensor 100. This process can then be repeated with an additional pass through the fuser and inverter to test the image quality effect when an image is transferred to an already fused substrate, that is, to measure the effects of the duplex as well as simplex printing.

It should be understood that the present invention could be used in many different ways. However, because special test images contain predetermined image segments in predetermined locations those special test images are preferred. A special test images might be produced when the printing machine is first turned on, after M number of prints, after a special operator command, after a major component is replaced, or during routine maintenance.

U.S. Pat. No. 5,574,527 taught the use of special test images with sensors located in the paper path and adjacent the photoreceptor. The printing machine 108 beneficially incorporates the teachings of that patent, but enhances those teaches by fusing the special test images to a substrate, inverting that substrate, and then sensing the fused special test image with the sensor 100. The result of the sensing of the fused image is used to control one or more of the previously described processing steps. Additionally there are measurements that can only be made with a fused test image. For example, the true color of a multilayer color image will only be apparent after fusing since individual toner surface reflection light scattering will dominate the optical measurement of any unfused toner images.

The sensor 100 could be any of a number of different types of sensors, including an enhanced toner area coverage (ETAC) infrared densitometer (IRD). However, a particularly useful sensor is a full metrically capable three color optical sensor. As shown in FIG. 2, that sensor is adjacent the photoreceptor between the transfer corotron 142 and the detack corotron 143 and is in the path of the substrate 141. That is, the sensor 100 is in the paper path. During the production of the composite toner layer on the photoreceptor the sensor 100 senses toner as described in U.S. Pat. No. 5,574,527. The sensor is used to sense or control various printing factors, including toner density (toner mass), photoreceptor charge, image registration, photoreceptor belt seam, faults or jams, paper path timing, fuser set points, developer biasing, and image exposure.

After duplexing, that is, after the special test image is fused and inverted, the substrate is returned to the photoreceptor via path 166 and the sensor 100 gathers even more information. First, the sensor 100 measures color registration. This is accomplished by measuring the timing between various developed color images and/or by measuring the occlusion/interference between color line images and black line images. Since the velocity of the substrate is known, by measuring the time between the various developed color images the final image color registration can be determined. By measuring the occlusion/interference between color line images and black line images the color verses black spot position registration can be determined.

In addition to the color registration measurements discussed above, the printing machine 108 also performs full colorimetry on the fused image. To do this the sensor 100 senses color bars on the special test image. The sensor's output when sensing the color bars is compared to a predetermined output that should occur if the color of the color bars are correct.

Any error found when sensing the fused color image is qualified and quantified and is then used to correct one or printing processes such that the fused color image is improved. Suitable printing process corrections might be to adjust the toner mass fused to the test substrate (such as by adjusting the potential of one or more developer housings, the charge on the photoreceptor, and/or one or more exposure levels), or to adjust the transfer and fusing processes (such as by adjusting the transfer potentials, fusing temperature and/or pressure, or the time substrates remain in the nip).

After the substrate separates from the photoreceptor belt 110 the image area continues its travel and passes a preclean erase lamp 50. That lamp neutralizes most of the charge remaining on the photoreceptor belt. After passing the preclean erase lamp the residual toner and/or debris on the photoreceptor is removed at a cleaning station 154. At the cleaning station cleaning blades wipe residual toner particles from the image area. This marks the end of the 4th cycle. The image area then passes once again to the precharge erase lamp and the start of another 4 cycles.

Using well known technology and well known integration techniques the various machine functions described above are managed and regulated by a controller which provides electrical command and control signals for the operations described above. To produce a high quality final image the controller requires information about various printing process parameters. The principles of the present invention specifically relate to the use of an optical sensor 100 that provides the controller with various process parameter information and to a duplex paper handler inverter 102 that is controlled by the controller.

In recapitulation, it has been shown that a single optical sensor can be used to measure multiple printing process parameters by transferring an image from a photoreceptor onto a substrate, inverting the substrate, and returning the inverted substrate across a sensor such that the transferred toner image is sensed. The measurements can then be used to control the printing process.

As the present invention can make better use of an existing sensor, the principles of the present invention are well suited to multiple pass REaD IOI printing machine architectures. However, the present invention is also applicable to other machines. For example, in single pass REaD IOI printers and in machines that do not use REaD IOI technology. An example of a machine that does not use REaD IOI technology is a printer that incorporates an intermediate transfer belt. By locating a sensor after the transfer to paper position and adjacent the intermediate transfer belt (instead of the photoreceptor as previously described), the same type of functions that were previously described can be accomplished. Additionally, the present invention is also suitable for direct transfer to paper machines. Therefore, while the present invention is described in relation to a four cycle REaD IOI printing machine, the present invention is to be limited only by the appended claims.

We claim:

1. A method of controlling a printing process in a printing machine, comprising the steps of:

producing a toner image on a surface;

transporting a substrate along a paper path which is adjacent to the toner image;

locating a sensor in the paper path and in a sensing relationship with the toner image;

transferring the toner image to the substrate;

fusing the transferred image to the substrate;

inverting the fused substrate;

sensing the image on the fused substrate with the sensor; and controlling a printing process based on the sensing of the image on the fused substrate.

2. The method of controlling a printing process as claimed in claim 1, wherein the sensor is a densitometer.

3. The method of controlling a printing process as claimed in claim 1, wherein the step of sensing the image on the fused substrate includes sensing color registration.

4. The method of controlling a printing process as claimed in claim 1, wherein the step of sensing the image on the fused substrate includes sensing interference between line images.

5. The method of controlling a printing process as claimed in claim 1, wherein the step of sensing the image on the fused substrate includes sensing colors of the fused substrate.

6. The method of controlling a printing process as claimed in claim 1, wherein the controlling step influences the mass of the toner image.

7. The method of controlling a printing process as claimed in claim 1, wherein the controlling step controls an image exposure system.

8. The method of controlling a printing process as claimed in claim 1, wherein said controlling step controls an image processing system.

9. The method of controlling a printing process as claimed in claim 1, wherein said controlling step controls an image fusing system.

10. The method of controlling a printing process as claimed in claim 1, wherein said controlling controls an image transfer system.

11. A method of controlling printing processes in a printing machine comprising:

forming a latent image on a charge retentive surface;

developing said latent image with a toner mass to produce a toner image;

transporting a transfer sheet along a paper path that is adjacent to said toner image;

locating an optoelectronic sensor in a sensing relationship with the toner image and the paper path;

sensing a printing parameter of the toner image using said optoelectronic sensor;

controlling a first printing process based on the sensed toner image;

transferring said toner image to said transfer sheet;

fusing said transferred toner image to said transfer sheet;

inverting said transfer sheet with its fused toner image;

sensing a printing parameter of the fused toner image using said optoelectronic sensor; and controlling a second printing process based on the sensed fused toner image.

12. The method of controlling printing processes as claimed in claim 11, wherein said sensor is a densitometer.

13. The method of controlling printing processes as claimed in claim 11, wherein said step of sensing the image on said fused transfer sheet includes sensing color registration.

14. The method of controlling printing processes as claimed in claim 11, wherein said step of controlling said second printing process influences toner mass.

15. The method of controlling printing processes as claimed in claim 11, wherein said step of controlling said second printing process includes controlling an image exposure system.

16. The method of controlling printing processes as claimed in claim 11, wherein said step of controlling said second printing process includes controlling an image processing system.

17. The method of controlling printing processes as claimed in claim 11, wherein said step of controlling said second printing process includes controlling an image fusing system.

18. The method of controlling printing processes as claimed in claim 11, wherein said step of controlling said second printing process includes controlling an image transfer system.

19. A method of controlling printing processes in a printing machine comprising:

forming four latent images on a charge retentive surface, each latent image being associated with a different color;

developing each latent image with a different color of toner;

fusing developed toner onto a substrate;

inverting said developed substrate;

sensing the developed toner on said inverted developed substrate; and controlling a printing process based on the sensed developed toner.

20. The method of controlling printing processes in a printing machine as claimed in claim 19, wherein a densitometer performs the step of sensing the developed toner on said inverted developed substrate.

* * * * *